(12) United States Patent
Hinton et al.

(10) Patent No.: US 8,658,285 B2
(45) Date of Patent: Feb. 25, 2014

(54) OPTICALLY CLEAR UV AND HYDROLYSIS RESISTANT POLYESTER FILM

(75) Inventors: Carlos Hinton, West Warwick, RI (US); Nao Yokota, Saunderstown, RI (US); Hirokazu Tajima, Osaka (JP); Roberto Siu, Providence, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 231 days.

(21) Appl. No.: 13/156,582

(22) Filed: Jun. 9, 2011

(65) Prior Publication Data

US 2011/0305913 A1 Dec. 15, 2011

Related U.S. Application Data

(60) Provisional application No. 61/353,077, filed on Jun. 9, 2010.

(51) Int. Cl.

| B32B 27/18 | (2006.01) |
| B32B 27/36 | (2006.01) |
| B32B 17/10 | (2006.01) |
| C08L 67/02 | (2006.01) |
| C08L 67/03 | (2006.01) |
| B29C 47/00 | (2006.01) |
| B29C 55/10 | (2006.01) |
| B29C 55/12 | (2006.01) |

(52) U.S. Cl.
USPC ........ 428/480; 428/430; 428/195.1; 428/201; 428/910; 264/165; 264/171.1; 264/176.1; 264/288.4; 264/290.2; 528/308; 528/308.1; 528/308.6

(58) Field of Classification Search
None
See application file for complete search history.

(56) References Cited

U.S. PATENT DOCUMENTS

| 5,686,552 A | * | 11/1997 | Masuda et al. ............... 528/193 |
| 5,804,626 A | * | 9/1998 | Rogers et al. ................. 524/195 |
| 5,889,096 A | * | 3/1999 | Imashiro et al. .............. 524/195 |
| 6,126,860 A | * | 10/2000 | Imashiro et al. .............. 252/390 |
| 6,593,406 B2 | | 7/2003 | Sargeant et al. |
| 6,706,387 B2 | * | 3/2004 | Butera et al. .................. 428/327 |
| 6,709,740 B2 | * | 3/2004 | Butera et al. .................. 428/327 |
| 6,794,432 B2 | | 9/2004 | Murschall et al. |
| 6,846,325 B2 | * | 1/2005 | Liddicoat ...................... 623/2.4 |
| 6,855,758 B2 | * | 2/2005 | Murschall et al. ............ 524/195 |
| 6,863,954 B2 | * | 3/2005 | Peiffer et al. .................. 428/141 |
| 6,921,580 B2 | * | 7/2005 | Akatsu et al. ................. 428/480 |
| 7,138,176 B2 | | 11/2006 | Murschall et al. |
| 7,157,132 B2 | | 1/2007 | Murschall et al. |
| 7,166,653 B2 | * | 1/2007 | Leppard et al. ............... 523/122 |
| 7,534,487 B2 | * | 5/2009 | Klein et al. .................... 428/328 |
| 7,794,822 B2 | * | 9/2010 | Kliesch et al. ................ 428/212 |
| 8,114,504 B2 | * | 2/2012 | Yakushidoh et al. ......... 428/212 |
| 2002/0065346 A1 | | 5/2002 | Murschall et al. |
| 2003/0091843 A1 | * | 5/2003 | Murschall et al. ............ 428/480 |
| 2005/0019555 A1 | | 1/2005 | Yano et al. |
| 2006/0008638 A1 | * | 1/2006 | Kiehne et al. ................. 428/323 |
| 2008/0262146 A1 | * | 10/2008 | Yonezawa et al. ............ 524/560 |
| 2010/0292375 A1 | * | 11/2010 | Kliesch et al. ................ 524/114 |
| 2012/0227801 A1 | * | 9/2012 | Brennan et al. ............... 136/256 |

FOREIGN PATENT DOCUMENTS

| EP | 0 738 749 | * | 10/1996 |
| JP | 2006-219567 | * | 8/2006 |
| JP | 2008-169239 | * | 7/2008 |

OTHER PUBLICATIONS

International Search Report and Written Opinion mailed Oct. 5, 2011, directed to counterpart International Application No. PCT/US11/39753; 11 pages.

* cited by examiner

*Primary Examiner* — Vivian Chen

(74) *Attorney, Agent, or Firm* — Morrison & Foerster LLP

(57) ABSTRACT

Biaxially oriented polyester films including polyester polymer, a carbodiimide hydrolysis stabilizer, and a UV absorber are described. The polyester films have a carboxyl end group concentration of 5-20 equivalents per ton, and a haze value of 2% or less. The films exhibit superior transparency and possess stable light transmission characteristics. Methods of making the films and articles produced from the films are also described.

31 Claims, No Drawings

OPTICALLY CLEAR UV AND HYDROLYSIS RESISTANT POLYESTER FILM

CROSS-REFERENCE TO RELATED APPLICATION

This application claims the benefit of priority of U.S. provisional application 61/353,077 filed Jun. 9, 2010, the entirety of which is incorporated herein.

FIELD OF THE INVENTION

The invention relates to a clear transparent, biaxially oriented and heat-set polyester film with UV and hydrolysis resistance having multiple layers. It further relates to the use of the film and to a process for its production.

BACKGROUND OF THE INVENTION

An increasingly important utility for transparent polyester film has been solar control coatings for exterior windows, doors, skylights, building walls, such as in skyscrapers, and the like. Radiation from sunlight can penetrate uncoated windows and affect the articles inside such as exposed fabric and furniture. Over prolonged periods colors of articles exposed to sunlight can fade and may partially disintegrate. Coating bare window materials with solar transparent polyester control films is a technique for reducing the adverse effects of sunlight exposure. Transparent polyester films may used outside in a variety of other applications as well. For example, the films may be used in flexible photovoltaic film, reflection film for signage, and display film applications. These outside applications typically require the polyester films to be both UV and hydrolysis resistant.

Some transparent biaxially oriented polyester films are known in the art. For example, U.S. Pat. Nos. 6,709,740 and 6,706,387 disclose ultra low haze, co-extruded, thermoplastic polymer films with easy handling prepared by co-extruding a blend of polyethylene terephthalate with organic and inorganic fillers. However, these patents do not disclose films that are UV and hydrolysis resistant.

U.S. Pat. No. 6,593,406 discloses polyester films with enhanced UV stabilization properties. However, this patent does not disclose films that are resistant to hydrolysis.

U.S. Pat. No. 6,855,758 discloses transparent polyester films with UV and hydrolysis resistance made from PET resin with an intrinsic viscosity (IV) of 0.658 or 0.632. The films in this patent possess some degree of transparency, UV resistance and hydrolysis resistance. However, in order to achieve the required hydrolysis resistance, the hydrolysis stabilizers need to be used at higher than 1 mass percent. This high percentage of hydrolysis stabilizers would result in an excessive generation of organic volatiles due to their thermal sensitivity.

U.S. Pat. Nos. 6,794,432, 7,138,176, and 7,157,132 disclose transparent, UV resistant polyester films that contain a flame-retardant. A hydrolysis stabilizer is added to prevent the flame retardant from increasing the film's susceptibility to hydrolysis not to provide additional hydrolysis resistance. In addition, the haze of the films in the examples is greater than 2%.

Accordingly, a need exists for a polymeric transparent film for outdoor applications that has superior performance characteristics than prior art films and can cost effectively produced and easily applied to end use applications. It is desirable for the film to be weather resistant, i.e., resistant to hydrolysis under hot and moist conditions. It is also desirable for the film to employ only small amounts of a hydrolysis stabilizer to achieve good hydrolysis resistance. Finally, it is desirable for the film to effectively reduce the transmission of ultraviolet light, and remain optically clear even after long exposure to sunlight.

SUMMARY OF THE INVENTION

It has been discovered that a particularly effective biaxially oriented polyester film may include a base layer of primarily high intrinsic viscosity polyester with a low carboxyl end group concentration. Additionally, the polyester resin formulation includes a combination of hydrolysis stabilizer in extremely low concentrations, compared to prior art formulations, and certain dispersed ultraviolet ("UV") light stabilizers. The formulation provides high clarity, reduced haze, effective interception of UV radiation and superior long term resistance to degradation from hydrolysis and UV attack. As described herein, biaxially oriented polyester films can be produced cost effectively from the polyester formulations because of lower volume resistivity.

Accordingly, one embodiment of a biaxially oriented polyester film includes polyester polymer, 0.010-0.1 wt. % of a carbodiimide hydrolysis stabilizer, and 0.1-2 wt. % UV absorber. The polyester film has a carboxyl end group concentration of 5-20 equivalents per ton, and a haze value of 2% or less.

The biaxially oriented polyester film may be a monolayer film, or include a plurality of layers. The polyester polymer may be polyethylene terephthalate, polyethylene naphthalate, polybutylene terephthalate, or polyethylene isophthalate. The film may have an intrinsic viscosity of 0.65-0.75.

The carbodiimide hydrolysis stabilizer may be a polymeric carbodiimide, or an aromatic polycarbodiimide having an amino group directly bonded to an aromatic ring. The UV absorber may have an absorbance peak between 300 nm to 340 nm. The UV absorber, for example, may be 2,4-bis-biphenyl-6-[2-hydroxy-4-(2-ethyl-hexyloxy)phenyl]-1,3,5-triazine.

The biaxially oriented polyester film may also include 50 to 100 ppm Mg and/or Mn, and 30 to 100 ppm phosphorus. The film may also include 2-50 wt. % recycled polyester polymer.

Preferably, the polyester film retains 50% or more of its tensile strength after storing the film in an autoclave for 60 hours at 120° C. and 100% relative humidity at 2 atmospheres pressures. Preferably, the polyester film retains 50% or more of tensile strength after 4000 hours of weathering and UV resistance testing according to ASTM G155 using the following testing conditions: (i) a UV output of 0.35 W/m2 at 340 nm, (ii) 102 min of light cycle at 63° C., (iii) 18 min of water spray, and (iv) a relative humidity of 50%.

Another embodiment is an article such as a protective sheet for a printed surface, a sheet for window glass, and a protective or a back sheet for photovoltaic module including the disclosed biaxially oriented polyester films.

Yet another embodiment is a method of making a biaxially oriented polyester film including extruding at least one layer comprising polyester polymer, 0.010-0.1 wt. % of a carbodiimide hydrolysis stabilizer, and 0.1-2 wt. % UV absorber, to produce a polyester film. The extruded film is then biaxially oriented. The biaxally oriented polyester film has a carboxyl end group concentration of 5-20 equivalents per ton, and a haze value of 2% or less.

The method may further include forming a masterbatch including the carbodiimide hydrolysis stabilizer, the UV absorber, and a masterbatch carrier. The masterbatch may then be blended with the polyester polymer prior to extruding the at least one layer including the polyester polymer. The masterbatch may include 5 to 50 wt. % carbodiimide hydrolysis stabilizer.

DETAILED DESCRIPTION OF THE INVENTION

The described films exhibit superior transparency and possess stable light transmission characteristics. Without wishing to be bound by any particular theory, the remarkable performance of these films is thought to be attributed to the unique combination of a low carboxyl group concentration polyester resin, a UV stabilizer and an end-capping hydrolysis resistant stabilizer at very low concentration.

One embodiment of a polyester film includes compounds made with polyester resins having a low carboxyl functional group concentration—referred to by the symbol COOH and measured in units of equivalents per ton. The COOH in the polyester film or resin contributes to hydrolysis degradation when the film or resin is exposed to heat and humidity. A preferred COOH content of the film includes 5 eq/ton or more and 20 eq/ton or less, in order to achieve the desired hydrolysis resistance while maintaining reasonable film making stability. More preferably, the COOH content of the film is less than 17 eq/ton, most preferably, less than 15 eq/ton.

To achieve the desired COOH content of the film, the COOH content of the polyester resin is preferably 5 to 17 eq/ton or less, because the polyester resin degrades and the COOH increases during the extrusion process. To reduce the COOH content of the polyester resin, the polyester preferably goes through a solid state polymerization process. However, a polyester resin possessing a COOH lower than 10 typically has a very high IV that makes processing and extrusion difficult because of processing issues such as high pressure at filters and high torque at extruders. Accordingly, preferably, the polyester resin has an IV of 0.65 to 0.75, more preferably 0.67 to 0.72. An IV lower than 0.65 may result in a COOH content that is too high and an IV higher than 0.75 may be too difficult to process into films.

Another way to achieve the desired COOH content range of the film is by end-capping the carboxyl groups of the polyester resin with the use of hydrolysis stabilizers. For example, the films may include at least 0.01 wt. % hydrolysis stabilizer and less than 0.1 wt. % of hydrolysis stabilizer. Lower than 0.01 wt. % hydrolysis stabilizer does not sufficiently improve the hydrolysis resistance. More than 0.1 wt. % hydrolysis stabilizer can cause undesirable effects such as off-gassing. More preferable is 0.05 to 0.1 wt % hydrolysis stabilizer.

Preferred hydrolysis stabilizers include monomeric carbodiimides, polymeric carbodiimides, aromatic polymeric carbodiimides having an amino group directly bonded to an aromatic ring, and oxazolines. Polymeric carbodiimides are especially preferred.

The polyester may, for example, be polyethylene terephthalate (PET), polyethylene naphthalate (PEN), polybutylene terephthalate (PBT), polyethylene isophthalate (IPET) and blends or co-polymers thereof. A preferred polyester is PET (polyethylene terephthalate) because of its good balance of cost and performance.

In one embodiment, a PET polymer can be obtained by esterification of terephthalic acid and ethylene glycol in a nitrogen atmosphere at a slightly elevated pressure (up to 2 atm) and temperature of 190-220° C., followed by polycocondensation of the resulting diester in the presence of a polymerization catalyst under conditions of high vacuum and melt temperature 275-285° C. Preferred polymerization catalysts include antimony compounds, germanium compounds and titanium compounds.

In another embodiment, the PET polymer can be obtained by transesterification of dimethyl terephthalate and ethylene glycol. A transesterification catalyst, such as Li, Ca, Mn, Mg, Zn or Pb acetate, is used in the ester interchange step to produce the diester. The ester interchange step takes in a nitrogen atmosphere at atmospheric pressure and a temperature of 190-220° C. At the end of the transesterification step, signified by the total removal of the methanol byproduct, a phosphorus compound is added to deactivate the transesterification catalyst. The next step of the polymerization proceeds in the same way as in the diacid-based process, utilizing a high vacuum and the presence of an antimony, titanium or germanium based catalyst.

The polyester resin preferably includes 50 to 100 ppm of a conductive metal compound, preferably manganese (Mg) and/or magnesium (Mn). The conductive metal compound can be added during the polymerization process as a catalyst or additive, or during the extrusion process in a masterbatch form to secure enough conductivity for electric pinning in the film making process. Less than 50 ppm of the metal compound may cause pinning issues, more than 100 ppm of the metal compound may degrade the hydrolysis and transparency performance.

Additional additives, for example, phosphorous (P) can be used to suppress coloring (yellowness) of the polyester and can be added in an amount of between 30 to 100 ppm. Less than 30 ppm may not sufficiently reduce undesirable coloring of the film, but more than 100 ppm may make the film hazier.

Examples of manganese compounds that may be used include manganese chloride, manganese bromide, manganese nitrate, manganese carbonate, manganese acetylacetonate, manganese acetate tetrahydrate, and manganese acetate dihydrate.

Examples of magnesium compounds that may be used include magnesium chlorides and carboxylates. Magnesium acetate is a particularly preferred compound.

The phosphorus-based compound is preferably a phosphoric acid-based compound, a phosphorous acid-based compound, a phosphonic acid-based compound, a phosphinic acid-based compound, a phosphine oxide-based compound, a phosphonous acid-based compound, a phosphinous acid-based compound, or a phosphine-based compound from the standpoint of thermal stability, suppression of debris, and improving hue. Phosphoric acid-based and phosphonic acid-based compounds are particularly preferable.

In a melt polymerization step, once the PET reaches a desired molecular weight, signified by the PET having an intrinsic viscosity of about 0.65-0.75 dl/g, the melt viscosity reaches a limit beyond which further increases in molecular weight by continued agitation in a melt reactor becomes very slow and further residence in the reactor may result in degradation. At that stage, the polymer is discharged, quenched in water, and cut down into amorphous chips. If further increases in molecular weight or decrease in the amount of carboxyl end groups are desired, further polymerization can take place at milder temperature conditions on the solid crystallized chips over long periods of time (several hours).

This solid state polymerization (SSP) process is a thermal procedure to reduce chips by reactively binding existing PET polymer chains via heat without oxygen present. The SSP process uses a high vacuum, purging or an inert gas (typically nitrogen) to drive off the by-products of the reaction (mainly water). The reaction is driven by the high temperature, the vacuum, and the diffusion of by-products from inside the PET chips to the surface. Solid state polymerization may take place in the batch mode using, for example, a rotary vacuum dryer, at temperatures ranging between 200-240° C. and vacuum below 1 mm Hg. An alternative continuous process may include feeding the crystallized chips downward through a tall column with dry nitrogen being blown counter-currently through the fixed bed of the chips to remove the water byproduct and drive the reaction towards higher molecular weights. In both cases, the residence time in the SSP reactor typically requires several hours, typically ranging between 5-20 hours depending on the final IV desired as well as the shape and size of the chips and the type of polycondensation catalyst present.

The polyester films also contain a UV absorber. The absorber preferably has a maximum absorption peak at 300-340 nm of UV light where PET resin is most sensitive to be degraded. Preferred UV absorbers include 2-hydroxybenzotriazoles, benzoxazinones and the triazines. A more preferred UV absorber is 2,4-bis-biphenyl-6-[2-hydroxy-4-(2-ethylhexyloxy)phenyl]-1,3,5-triazine. The content of UV absorber may be 0.1 to 2 wt. %. Less than 0.1 wt. % is not enough to be effective, more than 2 wt. % may increase haze, yellow color, affect the mechanical properties of the film, and may create processing issues such as off-gas and migration of the UV absorber. Preferably, the polyester film includes 0.1 to 2 wt/% UV absorber; more preferably in the range of 0.5 to 1.5%.

The film can be stretched biaxially and heat set to obtain crystalline orientation for enhanced physical properties. The oriented film generally has a thickness of from 1 to 500 μm, preferably from 5 to 350 μm. A film thickness of 10 to 50 μm may be preferred for some applications, such as for solar window film use.

The polyester film may have one layer or more layers. In one embodiment of a multilayer film, the film has two layers in an A/B structure. In yet another embodiment of a multilayer film, the film has three layers in an A/B/A' or A/B/C structure. Where the two outer layers are A and A' are present, they may be the same composition but have the same or different thicknesses. In the multilayer embodiments, some or all of the layers may include UV and hydrolysis stabilizers as disclosed herein. In some embodiments, depending on performance demanded by the end use application of the film, only the core layer includes hydrolysis stabilizers. The thickness of the outer layer(s) is generally above 0.1 μm, preferably in the range from about 0.2-5 μm, more preferably from about 0.5-2 μm.

The outer layers can further include other additives. Additional preferred additives in the outer layers include antiblock and slip additives. These are typically solid particles dispersed within the outer layer effectively to produce a low coefficient of friction on the exposed surface of the outer layer(s). This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used for polyester film applications include amorphous silica particles with mean particle size diameters in the range of 0.050-0.1 micrometers at concentrations of 0.1-0.4 mass-percent, calcium carbonate particles with a medium particle size of 0.3-1.2 micrometers at concentrations of 0.03-0.2 mass-percent, and. Precipitated alumina particles of sub-micron sizes may be used with an average particle size, for example, of 0.1 micro-meters and a mass-percent of 0.1-0.4. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene.

The base layer and/or outer layer(s) may also include other conventional additives, such as fillers. Preferably, these additional additives do not detract from optical clarity. The additives are preferably added in masterbatch form to the polymeric component(s) to obtain a granular feed. The granular feed can then be dried before melt-processing to fabricate the film. Examples of the other additives that may be added to the film layers include flame retardant additives and optical brighteners. The flame resistance of polyester films may be increased by adding halogenated polyphosphazanes, or dimethyl methylphosphate in the range of, for example, 1-10 mass-percent. The optical brightness of clear polyester films may be augmented by adding 1,2-Bis(5-methyl-2-Benzaxale)Ethylene, or 1,4-Bis(O-Cyanostryl)Benzene in the range of 0.5-10 mass-percentage.

Transmission haze is an important appearance attribute that can be quantified and used to assess the quality of transparent films. It measures the percent of transmitted light scattered at angle of more than 2.5° from the incident light. A haze value of 2% or less is considered good.

Advantageously, the films may be recycled without polluting the environment. Because of the predominantly polyester composition of the films, in some embodiments used or waste films can be recycled by being comminuted to particulate form. The resulting particles can be reprocessed as a recycled component, for example, in the base layer of the films described herein or in other polyester-containing products. The recycled polyester component of films and products may be as large a fraction of the product as possible without detracting from desired product properties. Although films and other products may be made entirely out of recycled polyester component, typically, the recycled polyester component accounts for less than about half of the polyester in the product. Preferably the recycled polyester component constitutes about 2-50 wt. % of the product, more preferably about 5-40 wt. %, and most preferably about 10-30 wt. %.

The films may be produced, for example, by extrusion or coextrusion, on an extrusion line. The stabilizers may be added to the film composition in the form of predried masterbatches, prior to extrusion or coextrusion of the film. Masterbatch processing involves pre-compounding the stabilizer into a carrier at stabilizer concentrations that are usually much higher than in the finished product composition but which can be controlled with great precision. The masterbatch may then be blended with neat polymer of a layer at a well-controlled proportion such that the desired, very low concentration of stabilizer in the final product is obtained with high precision. The concentration of stabilizer in the masterbatch may depend on the desired final product concentration and the precision of material metering and proportioning operations available. Typically, the proportion of hydrolysis stabilizer in the masterbatch is generally from 5 to 50% by weight, preferably from 5 to 20% by weight, based on the total weight of the masterbatch.

The stabilizers may be fully dispersed in the masterbatch carrier. The masterbatch carrier is preferably the same predominant polymer component of the layer in which the masterbatch is mixed. Preferably, the masterbatch carrier is a thermoplastic polyester and more preferably, polyethylene terephthalate. The masterbatch carrier may be a polymer other than the predominant polymer component of the layer provided that the masterbatch carrier polymer and the predominant polymer component are compatible. In this embodiment, "compatible" means that the masterbatch carrier has a refractive index and rheology similar to the predominant polymer component. If the refractive index and rheology are too dissimilar, excessive haze can form in the final product film.

The masterbatch processing technique can be used to provide the proper proportions of UV stabilizer, antiblock, slip additives, and hydrolysis stabilizers. Once prepared, these masterbatches should be thoroughly dried before melt-blending with the predominant polymer component to form the film layer compositions.

In a preferred extrusion process for producing the polyester film, masterbatch and crystallizable polyester feed particles are fed to a melt processor, such as a mixing extruder. The molten material, including the additives, is extruded through a slot die and quenched on a chill roll, in the form of a substantively amorphous prefilm. The film may then be reheated and stretched longitudinally and transversely or transversely and longitudinally, or longitudinally, transversely, and again longitudinally and/or transversely. The stretching temperatures are generally above the Tg of the film polymer by about 10 to 60° C. Preferably, the longitudinal stretching ratio is from 2 to 6, more preferably from 3 to 4.5. Preferably, the transverse stretching ratio is from 2 to 5, more preferably from 3 to 4.5. Preferably, any second longitudinal or transverse stretching is carried out at a ratio of from 1.1 to 5. The first longitudinal stretching may also be carried out at the same time as the transverse stretching (simultaneous stretching). Heat setting of the film may follow at an oven temperature of about 180 to 260° C., preferably about 220 to 250° C. The film may then be cooled and wound up.

One or both sides of the film can be coated or treated for adhesion promotion, surface conductivity, higher wetting tension etc. Preferred treatments include known methods such as corona treatment, plasma treatment, flame treatment and in-line coating methods.

This invention will be better understood with reference to the following examples, which are intended to illustrate specific embodiments within the overall scope of the invention. The examples are used below to describe the invention in further detail, without limiting the same. Film properties were tested as follows:

COOH Content

COOH content of the film and resin were tested according to ASTM D 7409-07. The procedure involves the titration of the carboxyl end groups with potassium hydroxide in an o-cresol/chloroform medium to a bromophenol blue endpoint. A known weight of PET sample is dissolved in o-cresol then chloroform and bromophenol blue are added to the solution. The solution is then titrated with potassium hydroxide until the color changes to blue as a result of the end group reaction. Based on the amount of KOH required for the titration, the quantity of carboxyl end groups is calculated. A COOH content of the film 5-20 eq/ton is considered good.

Intrinsic Viscosity (IV)

IV of the film and resin were tested according to ASTM D 460. This test method is for the determination of the inherent viscosity of poly(ethylene terephthalate) (PET) soluble at 0.50% concentration in a 60/40 phenol/1,1,2,2-tetrachloroethane solution by means of a glass capillary viscometer. An IV of 0.65 to 0.75 is considered good for film.

Tensile Strength and Elongation at Break

Tensile strength and elongation percent at break of the film were determined according to ASTM D882 using a Tensilon tester. The average number of machine direction and transverse direction is used.

Hydrolysis Resistance Test (Heat/Humidity Test)

Hydrolysis resistance of the films were tested after storing the film in an autoclave for 60 hours at 120° C. and 100% relative humidity at 2 atmospheres pressures. The tensile strength and elongation at break of the film after storing the film in the autoclave was compared to the tensile strength and elongation at break before the film was placed in the autoclave. Retention of 50% or more of the tensile strength was considered acceptable.

Weathering and UV Resistance Test

Weathering and UV resistance of the films were tested according to the ASTM G155 test with the following conditions: (a) Xe-Arc Weathering Chamber (Atlas Ci35), (b) Soda lime outer filter/CIRA inner filter, (c) UV output of 0.35 W/m2 at 340 nm, (d) 102 min of light cycle at 63° C., (e) 18 min of water spray, and (f) relative humidity was set to 50%. The tensile strength and elongation percent at break before and after 4000 hours at the above conditions were compared. Retention of 50% or tensile strength is acceptable.

Haze

Haze of the films was measured according to ASTM D1003. It measures the percent of transmitted light scattered at more than 2.5° from the incident light. A suitable instrument to measure haze is GARDNER HAZE-GUARD PLUS #475. A haze of 2% or less was considered acceptable.

Metal (Mn, Mg) and P Content

The Mn, Mg, and P content of the films were measured using a RIGAKU RIX 1000 X-Ray Fluorescent Spectrophotometer (FLX). This non-destructive method consists of irradiating a solid sample with an intense X-ray beam. The sample thus excited absorbs some of the energy and in turn emits X-rays along a spectrum of wavelengths characteristic of the types of atoms present in the sample; and the intensity of these emitted X-rays is proportional to the abundance of the elements in the sample. The desirable range is 50-100 ppm of Mn and/or Mg, and 30-100 ppm of P.

Volume Resistivity

The melt volume resistivity of the films were measured by placing 14 grs of the material in a test tube, and then placing the tube in a block heater until the material completely melted (typically in 2-3 minutes). Next, parallel thin metal probes connected to a resistomer were dipped into the melt and the resistance was measured.

Peak of UV Absorbance

The peak of UV/VIS absorbance of the UV absorber was measured in 10 ppm of chloroform using a Shimdzu UV-3150 UV-VIS spectrophotometer. It is desired that the highest peak be in the range of 300-340 nm.

EXAMPLES

Example 1

The polyethylene terephthalate resin pellets and masterbatch additives listed in Tables 1-1 to 1-4 were mixed according to the blend ratio shown in Table 2 and dried to less than 100 ppm moisture content, then extruded at a temperature of 285° C. for the outer layers A. Polyethylene terephthalate polyester resin pellets and masterbatch additives listed in Tables 1-1 to 1-3 were mixed according to the blend ratio shown in Table 2 and dried less than 100 ppm moisture content, then extruded at the temperature of 285° C. for the core layer B. These melt streams were then fed through a rectangular joining zone and laminated into a three layer co-extruded A/B/A structure. The resulting melt curtain was quenched on a casting drum at 20° C., oriented in the machine direction (×3.3 at 95° C.) with a roller stretcher, then oriented in the traverse direction (×4.0 at 110° C.) and heat-set at 230° C. and relaxed (5%) using a chain driven stretcher, and finally wound up. The biaxially oriented polyester film had an A/B/A thickness of 1.5/47/1.5 micron. The biaxially oriented polyester film had preferable UV, hydrolysis resistance and optical properties as shown in Table 2. During the film making process, there were no processing issues and the film could be easily wound without any defects.

Examples 2-5

Comparative Examples 1-9

These films were made in the same manner as Example 1, except the blend ratios shown in Table 2 were used. Example 2 shows the effect of doubling the content of UVA1. UVA1 is a melt compounded masterbatch whose PET matrix was degraded by the compounding process. Thus, the higher percent of UVA1 caused the overall structure to show a lower, but still good, hydrolysis resistance. Conversely, the UV resistance of the overall structure was increased because the film had a greater content of UV absorber; and the film making process was not jeopardized. For Example 3, everything was the same as Example 1 except that the amount of hydrolysis resistance additive in all the layers was reduced to almost half in relation to Example 1. This caused the film to have a lower, but still acceptable, hydrolysis resistance. In addition, the UV resistance was still good since the concentration of the UV absorber was the same as in Example 1. There were no processing issues in making this film.

In Example 4, the amount of UV absorber was reduced compared to Example 1. This caused the overall percent of hydrolysis resistant PET to increase, making the film more hydrolysis resistant, but the reduced presence of the UV absorber caused the UV resistance of the film to be lower. Example 5 shows the effect of fabricating a film according to Example 1 and incorporating 40 mass-percent of regrind directly associated with the process of making Example 1 film. Due to the heat history, the recycled material had a PET matrix that was degraded in reference to the virgin PET, and the recycle caused the hydrolysis resistance to be the lowest of all the examples, and the UV resistance was not as good as the prior examples. The film making process was not jeopardized.

Comparative Examples 1 to 9 show the negative effects on the film's hydrolysis resistance and UV resistance when the mass-percents of the ingredients were changed, when using polyester resins with different IV's, or when changing the type of additive used. Comparative Example 1 shows that by eliminating the hydrolysis stabilizer HRA1, while keeping the presence of the UV additive, the film had poor hydrolysis resistance even when using a polyester resin that reasonably hydrolysis resistance due to its low COOH content. Accordingly, to generate a film with good hydrolysis resistance the contribution of a hydrolysis stabilizer agent should be used. Comparative Example 2, used a polyester resin that has a high carboxyl content, which rendered a film with poor hydrolysis resistance that could not be compensated for by the presence of the hydrolysis resistance agent. Comparative Example 3, used a polymer resin with a very high IV, a low Mg/Mn content and a poor melt conductivity. Although the films showed very good hydrolysis resistance and UV resistance, it was difficult to fabricate the film due to difficulty in getting a good pinning against the casting drum because of the low conductivity of the polyester resin, and because of the high IV caused high torques, and high pressures. The film also got hazy due to the high amount of P content.

Comparative Example 4 included additional hydrolysis resistance agent. The additional hydrolysis resistance agent produced a film with good hydrolysis resistance, but the off-gassing during film making process was excessive. Comparative Example 5 shows that when a large percent of the UV absorbing masterbatch is used, hydrolysis resistance is reduced. In addition, the melt quality was poor due to a lower melt viscosity and strength. Comparative Example 6 shows that using a different type of UV absorber produced a film having good hydrolysis resistance but poor UV resistance. In Comparative Example 7, another UV additive was used, and the UV resistance was again poor. Comparative Example 8 shows that when a very large amount of recycle was used the hydrolysis resistance, the UV resistance, and the film making process are compromised. In Comparative Example 9 a different hydrolysis resistance additive that worked as a chain extender was used. This additive restored broken bonds and produced a film that had good hydrolysis and UV resistance. However, during the fabrication of the film, gels were generated, the motor torques were high, and the melt pressure was high.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

TABLE 1-1

|      | IV of PET dl/g | COOH eq/ton | Mn + Mg content ppm | P content ppm | Melt Resistivity at 290° C. (Mega Ohms) |
|------|----------------|-------------|---------------------|---------------|------------------------------------------|
| PET1 | 0.72           | 13          | 90                  | 35            | 4.4                                      |
| PET2 | 0.82           | 11          | 20                  | 300           | +30                                      |
| PET3 | 0.65           | 33          | 50                  | 50            | 4.1                                      |

TABLE 1-2

|      | Hydrolysis resistant agent | Carrier PET | Content (as wt. %) | Operational Mechanism |
|------|-----------------------------|-------------|---------------------|------------------------|
| HRA1 | Polymeric carbodiimide: Stabaxol P400 (Rhein Chemie, Germany) | PET1 | PET1: HRA1 = 90:10 | End-Capper; COOH end group neutralization |
| HRA2 | Epoxy: Joncryl ADR 4368 (BASF, Germany) | PET1 | PET1: HRA2 = 90:10 | Chain restoration; chain extender |

TABLE 1-3

| | UV absorber | Peak of absorbance nm | Carrier PET | Content (as wt. %) |
|---|---|---|---|---|
| UVA1 | 2,4-bis-biphenyl-6-[2-hydroxy-4-(2-ethyl-hexyloxy)phenyl]-1,3,5-triazine | 320 | PET1 | PET1:UVA1 = 80:20 |
| UVA2 | 2-(4,6-diphenyl-1,3,5-triazin-2-yl)-5-[(hexyl)oxy]-phenol | 280 | PET1 | PET1:UVA2 = 80:20 |
| UVA3 | 2,2'-(1,4-phenylene)bis[4H-3,1-benzoxazin-4-one] | 350 | PET1 | PET1:UVA2 = 80:20 |

TABLE 1-4

| | Anti blocking additive | Secondary diameter micron meter | Carrier PET | Content (as wt. %) |
|---|---|---|---|---|
| AB1 | Alumina | 0.1 | PET1 | 1.5 |
| AB2 | CaCO3 | 1.0 | PET1 | 1.0 |

TABLE 2

| | | | Example 1 | | Example 2 | | Example 3 | | Example 4 | | Example 5 | |
|---|---|---|---|---|---|---|---|---|---|---|---|---|
| | Layer | Content | Chip/MB | Wt % | Chip/MB | Wt % | Chip/MB | Wt % | Chip/MB | Wt % | Chip/MB | Wt % |
| Blend | Outer layer(s) A | PET | PET1 | 69.6 | PET1 | 65.1 | PET1 | 70.0 | PET1 | 72.1 | PET1 | 69.6 |
| | | Hydrolysis resistant agent | HRA1 | 0.9 | HRA1 | 0.9 | HRA1 | 0.5 | HRA1 | 0.9 | HRA1 | 0.9 |
| | | UVA | UVA1 | 4.5 | UVA1 | 9.0 | UVA1 | 4.5 | UVA1 | 2.0 | UVA1 | 4.5 |
| | | Anti Blocking agent | AB1 | 20.0 | AB1 | 20.0 | AB1 | 20.0 | AB1 | 20.0 | AB1 | 20.0 |
| | | | AB2 | 5.0 | AB2 | 5.0 | AB2 | 5.0 | AB2 | 5.0 | AB2 | 5.0 |
| | Core layer B | PET | PET1 | 94.6 | PET1 | 94.6 | PET1 | 95.0 | PET1 | 97.1 | PET1 | 54.6 |
| | | Hydrolysis resistant agent | HRA1 | 0.9 | HRA1 | 0.9 | HRA1 | 0.5 | HRA1 | 0.9 | HRA1 | 0.9 |
| | | UVA | UVA1 | 4.5 | UVA1 | 4.5 | UVA1 | 4.5 | UVA1 | 2.0 | UVA1 | 4.5 |
| | | Recycle | | 0.0 | | 0.0 | | 0.0 | | 0.0 | Ex 1 | 40.0 |
| Film properties | | COOH eq/ton | 12 | | 13 | | 17 | | 11 | | 19 | |
| | | Film IV | 0.68 | | 0.66 | | 0.65 | | 0.68 | | 0.65 | |
| | | Hydrolysis Resistance Test Retention of Tensile Strength at break | 80% | | 71% | | 60% | | 84% | | 52% | |
| | | Hydrolysis Resistance Test Retention of Elongation Percentage at break | 92% | | 86% | | 72% | | 96% | | 61% | |
| | | Weathering and UV Resistance Test Retention of Tensile Strength at Break | 65% | | 69% | | 64% | | 52% | | 54% | |
| | | Weathering and UV Resistance Test Retention of Tensile Strength at Break | 71% | | 76% | | 72% | | 59% | | 61% | |
| | | Haze % | 1.4 | | 1.7 | | 1.4 | | 1.3 | | 2.0 | |
| | | Film making | Good | | good | | good | | good | | good | |

| | | | Comp Example 1 | | Comp Example 2 | | Comp Example 3 | | Comp Example 4 | | Comp Example 5 | |
|---|---|---|---|---|---|---|---|---|---|---|---|---|
| | Layer | Content | Chip/MB | Wt % | Chip/MB | Wt % | Chip/MB | Wt % | Chip/MB | Wt % | Chip/MB | Wt % |
| Blend | Out layer(s) A | PET | PET1 | 70.5 | PET3 | 69.6 | PET2 | 69.6 | PET1 | 68.5 | PET1 | 59.1 |
| | | Hydrolysis resistant agent | HRA1 | 0.0 | HRA1 | 0.9 | HRA1 | 0.9 | HRA1 | 2.0 | HRA1 | 0.9 |
| | | UVA | UVA1 | 4.5 | UVA1 | 4.5 | UVA1 | 4.5 | UVA1 | 4.5 | UVA1 | 15.0 |
| | | Anti Blocking agent | AB1 | 20.0 | AB1 | 20.0 | AB1 | 20.0 | AB1 | 20.0 | AB1 | 20.0 |
| | | | AB2 | 5.0 | AB2 | 5.0 | AB2 | 5.0 | AB2 | 5.0 | AB2 | 5.0 |
| | Core layer B | PET | PET1 | 95.5 | PET1 | 94.6 | PET2 | 94.6 | PET1 | 93.5 | PET1 | 84.1 |
| | | Hydrolysis resistant agent | HRA1 | 0.0 | HRA1 | 0.9 | HRA1 | 0.9 | HRA1 | 2.0 | HRA1 | 0.9 |
| | | UVA | UVA1 | 4.5 | UVA1 | 4.5 | UVA1 | 4.5 | UVA1 | 4.5 | UVA1 | 15.0 |
| | | Recycle | | 0.0 | | 0.0 | | 0.0 | | 0.0 | | 0.0 |
| Film properties | | COOH eq/ton | 21 | | 25 | | 9 | | 10 | | 22 | |
| | | Film IV | 0.64 | | 0.63 | | 0.74 | | 0.73 | | 0.64 | |
| | | Hydrolysis Resistance Test Retention of Tensile Strength at break | 45% | | 30% | | 89% | | 86% | | 40% | |

TABLE 2-continued

|  |  | | | | | |
|---|---|---|---|---|---|---|
|  | Hydrolysis Resistance Test Retention of Elongation Percentage at break | 41% | 44% | 93% | 92% | 43% |
|  | Weathering and UV Resistance Test Retention of Tensile Strength at Break | 65% | 63% | 64% | 65% | 70% |
|  | Weathering and UV Resistance Test Retention of Tensile Strength at Break | 71% | 70% | 72% | 70% | 75% |
|  | Haze % | 1.3 | 1.4 | 15.2 | 1.6 | 1.9 |
|  | Film making | good | Good | Poor electro-static pinning high torque and pressure | off-gas | Weak Melt Strength, |

| | | Comp Example 6 | | Comp Example 7 | | Comp Example 8 | | Comp Example 9 | |
|---|---|---|---|---|---|---|---|---|---|
| Layer | Content | Chip/MB | Wt % | Chip/MB | Wt % | Chip/MB | Wt % | Chip/MB | Wt. % |
| Blend Out layer(s) A | PET | PET1 | 69.6 | PET1 | 69.6 | PET1 | 69.6 | PET | 69.6 |
|  | Hydrolysis resistant agent | HRA1 | 0.9 | HRA1 | 0.9 | HRA1 | 0.9 | HRA2 | 0.9 |
|  | UVA | UVA2 | 4.5 | UVA3 | 4.5 | UVA1 | 4.5 | UVA1 | 4.5 |
|  | Anti Blocking agent | AB1 | 20.0 | AB1 | 20.0 | AB1 | 20.0 | AB1 | 20.0 |
|  |  | AB2 | 5.0 | AB2 | 5.0 | AB2 | 5.0 | AB2 | 5.0 |
| Core layer B | PET | PET1 | 94.6 | PET1 | 94.6 | PET1 | 34.6 | PET | 94.6 |
|  | Hydrolysis resistant agent | HRA1 | 0.9 | HRA1 | 0.9 | HRA1 | 0.9 | HRA2 | 0.9 |
|  | UVA | UVA2 | 4.5 | UVA3 | 4.5 | UVA1 | 4.5 | UVA1 | 4.5 |
|  | Recycle |  | 0.0 |  | 0.0 | Ex 1 | 60.0 |  | 0.0 |
| Film properties | COOH eq/ton | 13 | | 14 | | 23 | | 9 | |
|  | Film IV | 0.67 | | 0.67 | | 0.62 | | 0.76 | |
|  | Hydrolysis Resistance Test Retention of Tensile Strength at break | 75% | | 72% | | 38% | | 82% | |
|  | Hydrolysis Resistance Test Retention of Elongation Percentage at break | 03% | | 91% | | 46% | | 94% | |
|  | Weathering and UV Resistance Test Retention of Tensile Strength at Break | 15% | | 41% | | 51% | | 68% | |
|  | Weathering and UV Resistance Test Retention of Tensile Strength at Break | 6% | | 49% | | 57% | | 74% | |
|  | Haze % | 1.3 | | 1.6 | | 2.0 | | 1.9 | |
|  | Film making | good | | good | | marginal | | Gels, high torque and pressures | |

What is claimed is:

1. A biaxially oriented polyester film comprising a plurality of individual layers, one of the individual layers comprising:
   polyester polymer;
   a carbodiimide hydrolysis stabilizer having a content of 0.010 wt. % or more and less than 0.1 wt. %; and
   a UV absorber having a content of 0.1 wt. % or more and 2 wt. % or less,
   wherein the polyester film has a carboxyl end group concentration of 5-20 equivalents per ton, and a haze value of 2% or less.

2. The biaxially oriented polyester film of claim 1, wherein the polyester polymer is polyethylene terephthalate.

3. The biaxially oriented polyester film of claim 1, wherein the polyester polymer is polyethylene naphthalate, polybutylene terephthalate, or polyethylene isophthalate.

4. The biaxially oriented polyester film of claim 1, wherein the polyester film has an intrinsic viscosity of 0.65-0.75.

5. The biaxially oriented polyester film of claim 1, wherein the carbodiimide hydrolysis stabilizer is a polymeric carbodiimide.

6. The biaxially oriented polyester film of claim 1, wherein the carbodiimide hydrolysis stabilizer is an aromatic polycarbodiimide having an amino group directly bonded to an aromatic ring.

7. The biaxially oriented polyester film of claim 1, wherein the UV absorber has an absorbance peak between 300 nm to 340 nm.

8. The biaxially oriented polyester film of claim 1, wherein the UV absorber is 2,4-bis-biphenyl-6-[2-hydroxy-4-(2-ethyl-hexyloxy)phenyl]-1,3,5-triazine.

9. The biaxially oriented polyester film of claim 1, further comprising 50 to 100 ppm Mg and/or Mn.

10. The biaxially oriented polyester film of claim 1, further comprising 30 to 100 ppm phosphorus.

11. The biaxially oriented polyester film of claim 1, wherein the polyester film comprises 2-50 wt. % recycled polyester polymer.

12. The biaxially oriented polyester film of claim 1, wherein the polyester film retains 50% or more of its tensile strength after storing the film in an autoclave for 60 hours at 120° C. and 100% relative humidity at 2 atmospheres pressures.

13. The biaxally oriented polyester film of claim 1, wherein the polyester film retains 50% or more of tensile strength after 4000 hours of weathering and UV resistance testing according to ASTM G155 using the following testing conditions: (i) a UV output of 0.35 W/m2 at 340 nm, (ii) 102 min of light cycle at 63° C., (iii) 18 min of water spray, and (iv) a relative humidity of 50%.

14. An article selected from the group consisting of a protective sheet for a printed surface, a sheet for window glass and a protective or a back sheet for photovoltaic module comprising the biaxially oriented polyester film of claim 1.

15. The biaxally oriented polyester film of claim 1, wherein the content of the carbodiimide hydrolysis stabilizer is less than or equal to 0.09 wt. %.

16. A monolayer biaxially oriented polyester film comprising:
   polyester polymer;
   a carbodiimide hydrolysis stabilizer having a content of 0.010 wt. % or more and less than 0.1 wt. %; and
   a UV absorber having a content of 0.1 wt. % or more and 2 wt. % or less,
   wherein the polyester film has a carboxyl end group concentration of 5-20 equivalents per ton, and a haze value of 2% or less.

17. A method of making a biaxially oriented polyester film comprising a plurality of individual layers, comprising:
   extruding one individual layer comprising polyester polymer, a carbodiimide hydrolysis stabilizer, and a UV absorber, to produce a polyester film; and
   biaxially orienting the extruded layer,
   wherein the one individual layer has a carboxyl end group concentration of 5-20 equivalents per ton, and a haze value of 2% or less, a carbodiimide hydrolysis stabilizer content of 0.010 wt. % or more and less than 0.1 wt. %, and a UV absorber content of 0.1 wt. % or more and 2 wt. % or less.

18. The method of claim 17, further comprising:
   forming a masterbatch comprising the carbodiimide hydrolysis stabilizer, the UV absorber, and a masterbatch carrier; and
   blending the masterbatch with the polyester polymer prior to extruding the one individual layer comprising polyester polymer.

19. The method of claim 18, wherein the masterbatch comprises 5 to 50 wt. % carbodiimide hydrolysis stabilizer.

20. The method of claim 17, wherein the polyester polymer is polyethylene terephthalate.

21. The method of claim 17, wherein the polyester polymer is polyethylene naphthalate, polybutylene terephthalate, or polyethylene isophthalate.

22. The method of claim 17, wherein the extruded polyester film has an intrinsic viscosity of 0.65-0.75.

23. The method of claim 17, wherein the carbodiimide hydrolysis stabilizer is a polymeric carbodiimide.

24. The method of claim 17, wherein the carbodiimide hydrolysis stabilizer is an aromatic polycarbodiimide having an amino group directly bonded to an aromatic ring.

25. The method of claim 17, wherein the UV absorber has an absorbance peak between 300 nm to 340 nm.

26. The method of claim 17, wherein the UV absorber is 2,4-bis-biphenyl-6-[2-hydroxy-4-(2-ethyl-hexyloxy)phenyl]-1,3,5-triazine.

27. The method of claim 17, wherein the one extruded layer comprises 50 to 100 ppm Mg and/or Mn.

28. The method of claim 17, wherein the one extruded layer comprises 30 to 100 ppm phosphorus.

29. The method of claim 17, wherein the polyester film comprises 2-50 wt. % recycled polyester.

30. The biaxally oriented polyester film of claim 17, wherein the content of the carbodiimide hydrolysis stabilizer is less than or equal to 0.09 wt. %.

31. A method of making a single layer biaxially oriented polyester film, comprising:
   extruding one layer comprising polyester polymer, a carbodiimide hydrolysis stabilizer, and a UV absorber, to produce a polyester film; and
   biaxially orienting the extruded film,
   wherein the biaxally oriented polyester film has a carboxyl end group concentration of 5-20 equivalents per ton, and a haze value of 2% or less, and
   the carbodiimide hydrolysis stabilizer has a content of 0.010 wt. % or more and less than 0.1 wt. %, and the UV absorber has a content of 0.1 wt. % or more and 2 wt. % or less.

* * * * *